(12) United States Patent
Yamamoto et al.

(10) Patent No.: US 11,888,299 B2
(45) Date of Patent: Jan. 30, 2024

(54) WIRING MEMBER

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Yukitoshi Terasaka, Yokkaichi (JP); Moriyuki Shimizu, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/810,865

(22) Filed: Jul. 6, 2022

(65) Prior Publication Data

US 2023/0010042 A1    Jan. 12, 2023

(30) Foreign Application Priority Data

Jul. 12, 2021    (JP) ................. 2021-114787

(51) Int. Cl.
*H02G 3/30*    (2006.01)
*H02G 3/04*    (2006.01)
*B60R 16/02*   (2006.01)

(52) U.S. Cl.
CPC ....... *H02G 3/0456* (2013.01); *B60R 16/0215* (2013.01); *H02G 3/30* (2013.01)

(58) Field of Classification Search
CPC ..... H02G 3/0456; H02G 3/30; B60R 16/0215
USPC ...................................................... 174/480
See application file for complete search history.

(56) References Cited

U.S. PATENT DOCUMENTS

| | | | | |
|---|---|---|---|---|
| 7,435,904 B2* | 10/2008 | Peterson | .................. | H02G 3/00 |
| | | | | 174/72 A |
| 9,948,075 B2* | 4/2018 | Tajer | .................... | H02G 3/0431 |
| D916,138 S * | 4/2021 | Canik | .............. | D15/5 |
| 11,101,628 B2* | 8/2021 | Jones | .................. | B60R 16/0215 |
| 2002/0031322 A1* | 3/2002 | Asada | ................. | H02G 3/0487 |
| | | | | 385/134 |
| 2008/0023223 A1* | 1/2008 | Suzuki | ................. | H02G 3/0481 |
| | | | | 174/72 A |
| 2012/0222296 A1* | 9/2012 | Miyamoto | ............ | E05F 15/443 |
| | | | | 29/825 |
| 2013/0118778 A1* | 5/2013 | Takahashi | ........... | B60R 16/0215 |
| | | | | 174/154 |
| 2014/0060880 A1* | 3/2014 | Gotou | .................. | H02G 3/0406 |
| | | | | 174/68.3 |
| 2014/0061398 A1* | 3/2014 | Kitamura | ............... | H01R 13/60 |
| | | | | 248/65 |
| 2020/0295546 A1 | 9/2020 | Yamamoto et al. | | |

* cited by examiner

*Primary Examiner* — Timothy J Thompson
*Assistant Examiner* — Michael F McAllister
(74) *Attorney, Agent, or Firm* — Honigman LLP

(57) ABSTRACT

Provided is a wiring member that can be held in a bent state more reliably even if a reaction force is large. A wiring member includes a cable including a bent portion that is routed along a bent path, and a bracket including a holding portion for holding the cable and a vehicle fixing portion that protrudes outward of the holding portion, and the holding portion includes a bend holding portion for holding the bent portion of the cable, and the bend holding portion includes an inner wall portion located on an inner circumferential side of the cable, and an outer wall portion located on an outer circumferential side of the cable.

8 Claims, 7 Drawing Sheets

WIRING MEMBER

CROSS-REFERENCE TO RELATED APPLICATIONS

This application claims priority of Japanese Patent Application No. JP 2021-114787 filed on Jul. 12, 2021, the contents of which are incorporated herein.

TECHNICAL FIELD

The present disclosure relates to a wiring member.

BACKGROUND

Japanese Application No. 2020-155402A discloses a wiring member that includes a wire and a resin molded portion. The wire includes a bent portion, and the resin molded portion covers the bent portion. Due to the resin molded portion including a bent reinforcement portion, even if a force acting to restore the wire to an initial shape such as a shape similar to a straight line occurs, the bent portion of the wire can be held more reliably.

If the diameter or the number of wires increases, a reaction force that acts to return the wires to a state that is close to their initial state increases. It is desired that the wires are able to resist a larger reaction force.

In view of this, an object of the present disclosure is to provide a technique that makes it possible to hold a wiring member in a bent state more reliably even if a reaction force is large.

SUMMARY

A wiring member according to the present disclosure is a wiring member including a wire including a bent portion that is routed along a bent path, and a bracket including a holding portion for holding the wire and a vehicle fixing portion that protrudes outward of the holding portion, and the holding portion includes a bend holding portion for holding the bent portion of the wire, and the bend holding portion includes an inner wall portion located on an inner circumferential side of the wire, and an outer wall portion located on an outer circumferential side of the wire, on the bent path.

According to the present disclosure, a wiring member can be held in a bent state more reliably even if a reaction force is large.

DETAILED DESCRIPTION OF PREFERRED EMBODIMENTS

Figure 1:
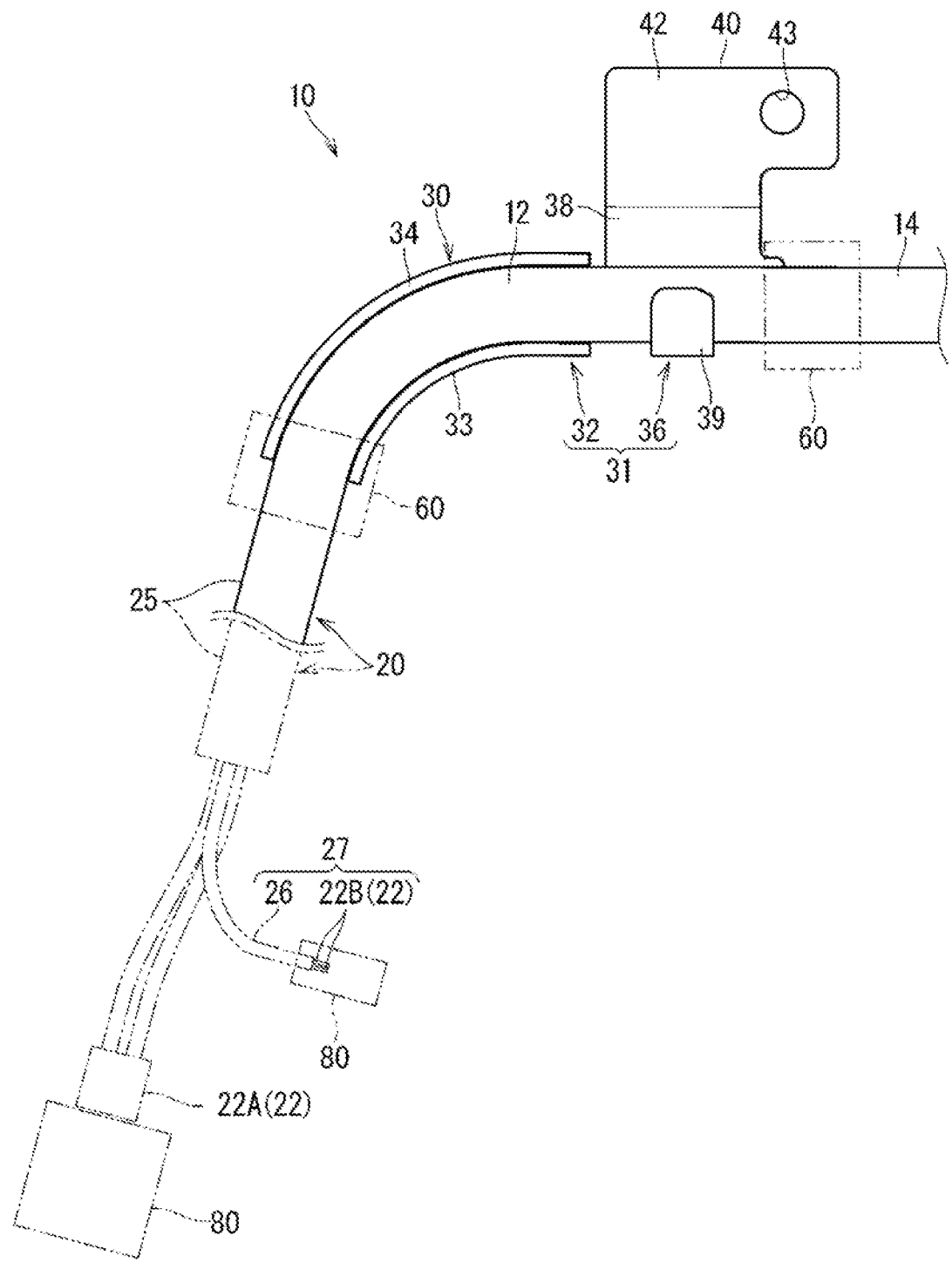
FIG. 1 is a plan view showing a wiring member according to a first embodiment.

First, embodiments of the present disclosure will be listed and described.

The wiring member according to the present disclosure is as follows.

First Aspect

A wiring member according to a first aspect includes a wire including a bent portion that is routed along a bent path, and a bracket including a holding portion for holding the wire and a vehicle fixing portion that protrudes outward of the holding portion, and the holding portion includes a bend holding portion for holding the bent portion of the wire, and the bend holding portion includes an inner wall portion located on an inner circumferential side of the wire, and an outer wall portion located on an outer circumferential side of the wire, on the bent path. The bracket is a rigid member with rigidity to the extent that it can resist being fixed to a vehicle by a vehicle fixing portion. The wire is held in a bent shape due to the inner wall portion and the outer wall portion provided in this bracket. In this manner, even if a reaction force is large, the wiring member can be held in a bent state more reliably.

Second Aspect

In a second aspect, a configuration is also possible in which, the wiring member according to the first aspect further includes a resin molded portion formed through insert molding using at least the bent portion and the bend holding portion as an insert, and the vehicle fixing portion is located outside of the resin molded portion. In this manner, the wire can be fixed to the bracket by the resin molded portion, and friction between the wire and the holding portion can be suppressed. Further, the entire circumference of the wire can be protected by the resin molded portion. Further, exposure of the bend holding portion can be suppressed, and damage to the peripheral members by the bend holding portion can be suppressed.

Third Aspect

In a third aspect, a configuration is also possible in which the wiring member according to the second aspect further includes the bend holding portion further includes a joining wall portion that joins the inner wall portion and the outer wall portion to each other, and resin of the resin molded portion is interposed between the bent portion and the joining wall portion. In this manner, friction between the bent portion and the joining wall portion can be suppressed.

Fourth Aspect

In a fourth aspect, a configuration is also possible in which, in the wiring member according to any one of the first to the third aspect, the wire is a multi-core cable including a plurality of core wires and a sheath for covering the plurality of core wires, the bent portion is provided at a portion where the sheath is provided, and the plurality of core wires extend out from an end portion of the sheath, and are connected to a plurality of devices located on an underbody of a vehicle. A multi-core cable is formed by a plurality of core wires for multiple devices on an underbody being integrated into one, and due to the plurality of core wires, a reaction force increases at the position where the sheath is provided. Even in this case, the wire can be held in a bent shape by the inner wall portion and the outer wall portion provided at the bracket.

Fifth Aspect

In a fifth aspect, a configuration is also possible in which, in the wiring member according to any one of the first to the fourth aspects, the wire further includes a straight portion that is routed along a straight path that is adjacent to the bent portion of the wire in a direction in which the wire extends, the holding portion further includes a straight portion holding portion for holding the straight portion, and the vehicle fixing portion is provided at the straight portion holding portion. In the state where the wiring member is attached to the vehicle, the wiring member vibrates with the vehicle fixing portion as the fixing point. In this case as well, due to the vehicle fixing portion being provided at the straight portion holding portion, the bent portion is likely to be held in the bent state by the bend holding portion.

Sixth Aspect

In a sixth aspect, a configuration is also possible in which, in the wiring member according to the fifth aspect, the straight portion holding portion includes a first wall portion, a second wall portion, and a third wall portion, the first wall portion covers the wire from the same side as the inner wall portion or the outer wall portion, the second wall portion and the third wall portion respectively protrude from two end portions of the first wall portion and face each other with the wire interposed therebetween, and the vehicle fixing portion extends out from the second wall portion. In this manner, the orientation of the holding portion varies between the bend holding portion and the straight portion holding portion, and the wire can be held reliably from four sides during vibration or the like.

Seventh Aspect

In a seventh aspect, a configuration is also possible in which, in the wiring member according to the sixth aspect, the vehicle fixing portion includes a first extended portion that extends from the second wall portion so as to oppose the first wall portion, and a distance between the first extended portion and the first wall portion is greater than a distance between the inner wall portion and the outer wall portion. In this manner, the wire can be housed in the straight portion holding portion holding portion through the space between the first extended portion and the first wall portion.

Eighth Aspect

In an eighth aspect, a configuration is also possible in which, in the wiring member according to any one of the first to the seventh aspect, at least one of the inner wall portion and the outer wall portion is continuously provided along the bent path. In this manner, high rigidity of the bend holding portion can be achieved.

Ninth Aspect

In a ninth aspect, a configuration is also possible in which, in the wiring member according to any one of the first to the eighth aspects, at least one of the inner wall portion and the outer wall portion is intermittently provided along the bent path. In this manner, the weight of the bracket can be reduced.

Tenth Aspect

In a tenth aspect, a configuration is also possible in which, in the wiring member according to any one of the first to the ninth aspect, one of the inner wall portion and the outer wall portion is continuously provided along the bent path, and the other of the inner wall portion and the outer wall portion is intermittently provided along the bent path. In this manner, the rigidity of the bend holding portion can be improved due to the wall portion being continuously provided along the bend holding portion, and the weight of the bracket can be reduced due to the wall portion being provided intermittently along the bent path.

Specific examples of the wiring member of the present disclosure will be described below with reference to the drawings. It should be noted that the present disclosure is not limited to these examples, but is indicated by the scope of the claims, and all changes that come within the meaning and range of equivalency of the claims are intended to be embraced therein.

First Embodiment

Figure 2:
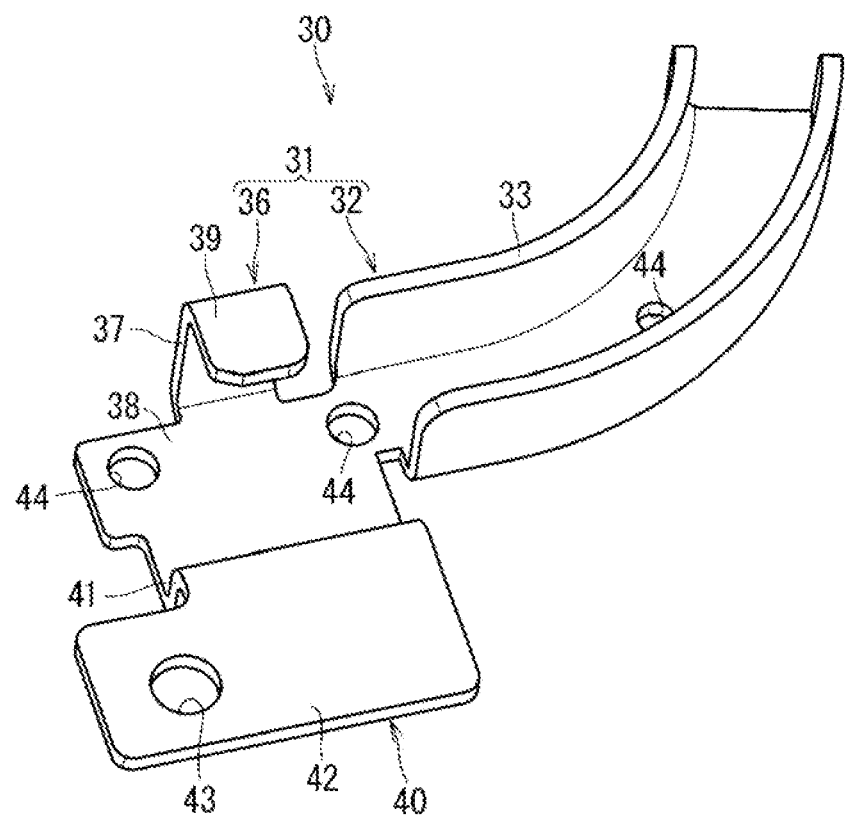
FIG. 2 is a perspective view showing a bracket.

Hereinafter, a wiring member according to a first embodiment will be described. FIG. 1 is a plan view showing a wiring member 10 according to the first embodiment. FIG. 2 is a perspective view showing a bracket 30.

The wiring member 10 includes a cable 20 and the bracket 30.

The wiring member 10 may include a single wire or one or more wires. Here, an example in which the wiring member 10 includes a plurality of wires will be described. Here, an example will be described in which the wiring member 10 includes a multi-core cable 20 in which a plurality of wires are integrated into one. The multi-core cable 20 includes a plurality of core cables 22 and a sheath 25. The sheath 25 covers the plurality of core cables 22. The plurality of core cables 22 are integrated by the sheath 25. The plurality of core cables 22 are bundled together by the sheath 25 in a portion where the sheath 25 is provided. The multi-core cable 20 can be treated like a single wire at a position where the sheath 25 is provided. Hereinafter, the multi-core cable 20 may simply be called the cable 20.

The core cables 22 are coated wires. The core cables 22 each include a core wire 23 and a coating 24 that covers the circumference of the core wire 23 (see FIG. 4). The core wire 23 is a conductive wire made of copper, a copper alloy, aluminum, or an aluminum alloy. The core wire 23 may be formed by a single wire or a twisted wires. The coating 24 is an insulating coating made of resin or the like, and formed by performing extrusion coating using a resin on the circumference of the core wire 23. The coating 24 is made of polyethylene, for example.

The sheath 25 is an insulating coating made of a resin or the like. The sheath 25 is formed by performing extrusion coating using a resin on the circumference of the plurality of core cables 22, for example. The sheath 25 is made of polyurethane, for example. The sheath 25 may also be omitted.

The wiring member 10 is envisioned as being routed along a bent path in a vehicle or the like. For this reason, the multi-core cable 20 includes a bent portion 12 that is routed along a bent path. Here, the bent portion 12 is provided at a position where the sheath 25 is provided. The cable 20 further includes a straight portion 14 that is routed along a straight path adjacent to the bent portion 12 in the direction in which the cable 20 extends.

The shape in which the wiring member 10 is bent is determined depending on the positional relationship between the wiring member 10 and a portion to which an end portion of the wiring member 10 is attached, the layout of objects that may cause interference in the portion where the wiring member 10 is routed, and the like.

The sheath 25 includes an end portion from which the plurality of core cables 22 are exposed at an intermediate position in the direction in which the plurality of core cables 22 extend. As shown in FIG. 1, the plurality of core cables 22 extend out from the end portion of the sheath 25 and are connected to a plurality of devices 80 located on the underbody of the vehicle. The plurality of core cables 22 that extend out from the end portion of the sheath 25 normally extend toward devices 80 to which they are to be connected, while forming two or more branches. Here, an example in which the wiring member 10 includes four core cables 22 will be described. The four core cables 22 that extend out from the end portion of the sheath 25 branch into two groups, namely, two core cables 22A and two core cables 22B.

The two core cables 22A are power source lines for transferring electric power, for example. For example, the core cables 22A may also be power source lines for supplying electric power to an EPB (Electric Parking Brake) or an EMB (Electro-Mechanical Brake). In the example shown in FIG. 1, the leading end portions of the core cables 22A are connected to the device 80 via the connector 28.

The two core cables 22B are signal lines for transferring signals, for example. For example, the core cables 22B may also be signal lines for transferring signals from a sensor for detecting wheel speed in an ABS (Anti-Lock Brake System). In the example shown in FIG. 1, the leading end portions of the core cables 22B are integrated with the sensor (device 80).

The two core cables 22B may be covered by a sheath 26 at an intermediate position in the direction in which the core cables 22B extend to form a cable 27. The two core cables 22B may also extend out as the cable 27 from the end portion of the sheath 25. The sheath 25 may also appear to cover three wire members, namely, two core cables 22 and one cable 27.

Another end portion of the cable 20 may also extend toward the vehicle body. The other end portion of the cable 20 may also be connected to a device such as an electronic control unit disposed on the vehicle body.

The bracket 30 includes a holding portion 31 and a vehicle fixing portion 40. The bracket 30 is made of metal, for example. The bracket 30 may also be made of a hard resin. The bracket 30 is formed by bending and deforming a plate member such as a metal plate. The bracket 30 may also be a molded component formed through injection molding or the like.

The holding portion 31 holds the cable 20. The holding portion 31 includes a bend holding portion 32. Here, the holding portion 31 further includes a straight portion holding portion 36. The straight portion holding portion 36 is continuous with one end portion of the bend holding portion 32.

The bend holding portion 32 holds the bent portion 12 of the cable 20. The bend holding portion 32 includes an inner wall portion 33 and an outer wall portion 34. The inner wall portion 33 is located on the inner circumferential side of the cable 20 on the bent path. The outer wall portion 34 is located on the outer circumferential side of the cable 20 on the bent path. The distance between the inner wall portion 33 and the outer wall portion 34 is equal to or greater than the diameter of the cable 20. Here, the distance between the inner wall portion 33 and the outer wall portion 34 is slightly greater than the diameter of the wire 20. At least one of the inner wall portion 33 and the outer wall portion 34 is provided continuously along the bent path. Here, both the inner wall portion 33 and the outer wall portion 34 are continuously provided along the bent path.

The bend holding portion 32 further includes a joining wall portion 35. The joining wall portion 35 joins the inner wall portion 33 and the outer wall portion 34 to each other. The joining wall portion 35 is also continuously provided along the bent path. In the bend holding portion 32, the cable 20 is covered from three sides by the inner wall portion 33, the outer wall portion 34, and the joining wall portion 35.

The straight portion holding portion 36 holds the straight portion 14 of the cable 20. The straight portion holding portion 36 includes a first wall portion 37, a second wall portion 38, and a third wall portion 39. Here, the first wall portion 37 covers the cable 20 from the same side as the inner wall portion 33 or the outer wall portion 34. Here, the first wall portion 37 covers the cable 20 from the same side as the inner wall portion 33. The second wall portion 38 and the third wall portion 39 respectively protrude from two end portions of the first wall portion 37. The second wall portion 38 and the third wall portion 39 oppose each other with the cable 20 interposed therebetween. Either one of the second wall portion 38 and the third wall portion 39 covers the cable 20 from the same side as the joining wall portion 35. Of the second wall portion 38 and the third wall portion 39, one wall portion from which a vehicle fixing portion 40 extends out is the second wall portion 38, and the other wall portion is the third wall portion 39. Here, the second wall portion 38 covers the cable 20 from the same side as the joining wall portion 35. The third wall portion 39 covers the cable 20 from the opposite side to the second wall portion 38 and the joining wall portion 35. In the straight portion holding portion 36, the cable 20 is covered from three sides by the first wall portion 37, the second wall portion 38, and the third wall portion 39.

The bend holding portion 32 and the straight portion holding portion 36 are continuous with each other. Here, the joining wall portion 35 and the second wall portion 38 are continuous with each other. The first wall portion 37 and the inner wall portion 33 here are spaced apart from each other in the direction in which the cable 20 extends. The first wall portion 37 is provided at a portion of the second wall portion 38 in the direction in which the cable 20 extends. The first wall portion 37 may also be continuous with the inner wall portion 33. The first wall portion 37 may also be provided extending the entirety of the second wall portion 38 along the direction in which the cable 20 extends. The second wall portion 38 may also be spaced apart from the joining wall portion 35.

The orientation of the opening of the bend holding portion 32 and the orientation of the opening of the straight portion holding portion 36 are different from each other. The bend holding portion 32 and the straight portion holding portion 36 of the cable 20 are covered from three sides by the walls. The two wall portions of the bend holding portion 32 and the two wall portions of the straight portion holding portion 36 cover the cable 20 from the same sides. The remaining one wall portion of the bend holding portion 32 and the remaining one wall portion of the straight portion holding portion 36 cover the cable 20 from respective sides that are different from each other. Specifically, the inner wall portion 33 of the bend holding portion 32 and the first wall portion 37 of the straight portion holding portion 36 cover the cable 20 from the same side. The joining wall portion 35 of the bend holding portion 32 and the second wall portion 38 of the straight portion holding portion 36 cover the cable 20 from the same side. The outer wall portion 34 of the bend holding portion 32 and the third wall portion 39 of the straight portion holding portion 36 cover the cable 20 from respective sides that are different from each other. The bend holding portion 32 is open toward the opposite side to the joining wall portion 35 (the front side relative to the paper surface of FIG. 1). The straight portion holding portion 36 is open toward the opposite side to the first wall portion 37 (the upper side relative to the paper surface of FIG. 1).

The vehicle fixing portion 40 protrudes outward of the holding portion 31. The vehicle fixing portion 40 is provided at a portion, in the direction in which the holding portion 31 extends, of the holding portion 31. Here, the vehicle fixing portion 40 is provided at the straight portion holding portion 36. The vehicle fixing portion 40 is not provided at the bend holding portion 32. The vehicle fixing portion 40 extends out from the second wall portion 38 of the straight portion holding portion 36. The vehicle fixing portion 40 includes a first extended portion 41 and a second extended portion 42. The first extended portion 41 extends from the second wall portion 38 so as to oppose the first wall portion 37. The second extended portion 42 extends from the first extended portion 41 so as to be distanced from the holding portion 31.

A screw hole 43 is formed in the second extended portion 42. The vehicle fixing portion 40 is fixed to an attachment target location of the vehicle. The vehicle fixing portion 40 may also be fixed to the attachment target location by other means such as welding or a fitting structure.

The distance between the first extended portion 41 and the first wall portion 37 is greater than the diameter of the cable 20. The distance between the first extended portion 41 and the first wall portion 37 is greater than the distance between the inner wall portion 33 and the outer wall portion 34. Since the second wall portion 38 is longer than the joining wall portion 35 in the width direction of the cable 20, the distance between the first extended portion 41 and the first wall portion 37 is greater than the distance between the inner wall portion 33 and the outer wall portion 34.

The protruding dimension of the third wall portion 39 from the first wall portion 37 may also be smaller than the protruding dimension of the second wall portion 38 from the first wall portion 37. The protruding dimension of the third wall portion 39 from the first wall portion 37 may also be smaller than the protruding dimension of the joining wall portion 35 from the inner wall portion 33. The protruding dimension of the first extended portion 41 from the second wall portion 38 may also be smaller than the protruding dimension of the first inner wall portion 37 from the second wall portion 38. In this manner, the opening of the straight portion holding portion 36 is wide and the cable 20 can be easily housed in the straight portion holding portion 36 through the opening.

A through hole 44 for thinning may also be formed in the bracket 30. In the example shown in FIG. 2, through holes 44 are respectively formed in the joining wall portion 35 and the second wall portion 38. The through hole 44 in the joining wall portion 35 is formed in an intermediate portion (here, the central portion) of the joining wall portion 35 in the direction in which the cable 20 extends. The through holes 44 in the second wall portion 38 are formed at two end portions of the second wall portion 38 in the direction in which the cable 20 extends.

For example, the cable 20 is fixed to the bracket 30 while being held along the inner wall portion 33 with respect to the bracket 30. How the cable 20 is fixed is not particularly limited and can be set as appropriate. For example, as shown in FIG. 1, the cable 20 may also be fixed to the bracket 30 by a binding member 60 such as adhesive tape or a cable tie being wound around the cable 20 and the bracket 30. Also, for example, the inner surface of the holding portion 31 and the outer surface of the cable 20 may also be adhered to each other by an adhesive or the like.

Effects, Etc.

According to the wiring member 10 configured as above, the bracket 30 is a rigid member with rigidity to the extent that it can resist being fixed to the vehicle fixing portion 40. The cable 20 can be held in a bent shape by the inner wall portion 33 and the outer wall portion 34 provided in the bracket 30. In this manner, even if the reaction force is large, the wiring member 10 can be held in a bent state more reliably.

An example is assumed in which the initial state of the cable 20 is a linear state or the like, and the cable 20 is held by the bend holding portion 32 while being bent relative to the initial state. In this case, since the cable 20 attempts to return in a direction in which the bending angle thereof becomes moderate, the reaction force acting on the cable 20 attempting to return to the initial state thereof acts on two end portions of the outer wall portion 34, the intermediate portion of the inner wall portion 33, and the like.

Another example is assumed in which the initial state of the cable 20 is a bent state and the cable 20 is held by the bend holding portion 32 in a state where the bend of the cable 20 is more moderate than the initial state. In this case, since the cable 20 attempts to return in a direction in which the bending angle thereof becomes sharp, the reaction force acting on the cable 20 attempting to return to the initial state thereof acts on two end portions of the inner wall portion 33, the intermediate portion of the outer wall portion 34, and the like.

In both the two cases, the reaction force acting on the cable 20 attempting to return to the initial state can be taken on by the inner wall portion 33 and the outer wall portion 34. For this reason, even if the reaction force is large, the wiring member 10 can be held in a bent state more reliably.

Also, since there is no large flange or the like on the inner circumferential side of the inner wall portion 33, a large space can be secured on the inner circumferential side of the inner wall portion 33. For this reason, even if the path of the wiring member 10 in the vehicle member is a path on which peripheral members are located on the inner circumferential side of the inner wall portion 33, interference between the wiring member 10 and the peripheral members can be suppressed.

Also, the multi-core cable 20 is formed by the core cables 22 for the plurality of devices on the underbody of the vehicle being integrated. Since the plurality of core cables 22 are present at the position corresponding to the sheath 25, the reaction force is large. In this case as well, the cable 20 can be held in a bent shape by the inner wall portion 33 and the outer wall portion 34 provided at the bracket 30.

In a state where the wiring member 10 is attached to the vehicle, the wiring member 10 vibrates with the vehicle fixing portion 40 as the fixing point. In this case as well, due to the vehicle fixing portion 40 being provided at the straight portion holding portion 36, the bent portion 12 is likely to be held in a bent state by the bend holding portion 32.

The first wall portion 37 of the straight portion holding portion 36 covers the cable 20 from the same side as the inner wall portion 33 or the outer wall portion 34, and the second wall 38 and the third wall portion 39 respectively protrude from two end portions of the first wall portion 37 and oppose each other with the cable 20 interposed therebetween. In this manner, the orientation of the opening of the holding portion 31 of the bend holding portion 32 is different from that of the straight portion holding portion 36, and thus the cable 20 can be reliably held from four sides.

Also, the vehicle fixing portion 40 includes the first extended portion 41 that extends from the third wall portion 39 so as to oppose the first wall portion 37, and the distance between the first extended portion 41 and the first wall portion 37 is greater than the distance between the inner wall portion 33 and the outer wall portion 34. In this manner, the cable 20 can be housed in the straight portion holding portion 36 through the space between the first extended portion 41 and the first wall portion 37.

Also, at least one of the inner wall portion 33 and the outer wall portion 34 is continuously provided along the bent path. In this manner, high rigidity can be obtained for the bend holding portion 32. Here, both the inner wall portion 33 and the outer wall portion 34 are continuously provided along the bent path. In this manner, high rigidity can be obtained for the bend holding portion 32.

Second Embodiment

Figure 3:
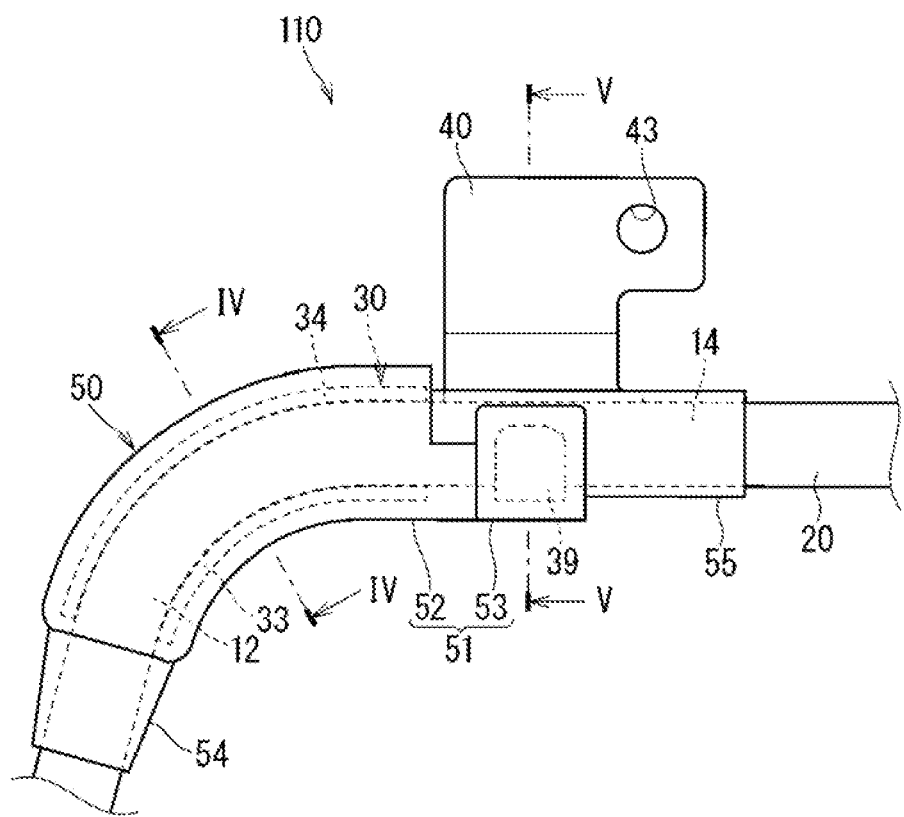
FIG. 3 is a plan view showing a wiring member according to a second embodiment.
Figure 4:
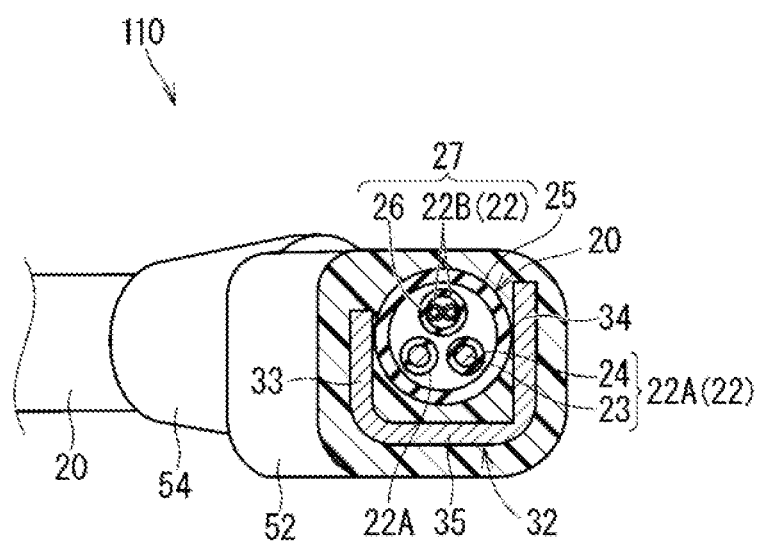
FIG. 4 is a cross-sectional view taken along line IV-IV in FIG. 3.
Figure 5:
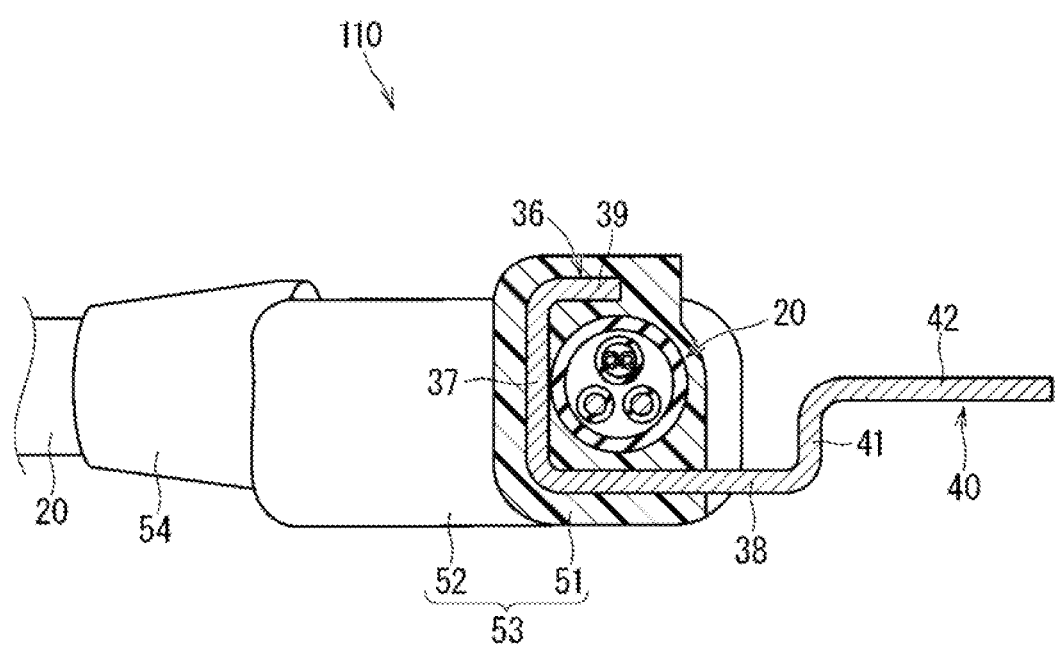
FIG. 5 is a cross-sectional view taken along line V-V in FIG. 3.

The wiring member according to a second embodiment will be described. FIG. 3 is a plan view showing a wiring member 110 according to the second embodiment. FIG. 4 is a cross-sectional view taken along line IV-IV in FIG. 3. FIG. 5 is a cross-sectional view taken along line V-V in FIG. 3. Note that, in the description of the present embodiment, the constituent elements that are similar to those described above will be given identical reference signs and the descriptions thereof will be omitted.

The wiring member 110 further includes a resin molded portion 50 in addition to the cable 20 and the bracket 30. The resin molded portion 50 is formed through insert molding using at least the bent portion 12 and the bend holding portion 32 as inserts. The vehicle fixing portion 40 is located outside of the resin molded portion 50. As a result of the wiring member 110 being provided with the resin molded portion 50, the cable 20 can be fixed to the bracket 30 by the resin molded portion 50, and friction between the cable 20 and the holding portion 31 can be suppressed. Also, the entire circumference of the cable 20 can be protected by the resin molded portion 50. Further, exposure of the bend holding portion 32 can be suppressed and damage to peripheral members caused by the bend holding portion 32 can be suppressed.

The resin molded portion 50 includes a main body portion 51. The main body portion 51 covers the bracket 30 and the cable 20. The main body portion 51 includes a bend covering portion 52 and a straight portion covering portion 53. The resin molded portion 50 further includes wire covering portions 54 and 55. The wire covering portions 54 and 55 only cover the cable 20 of the bracket 30 and the cable 20.

The bend covering portion 52 extends in a bent state. The bend covering portion 52 covers the bent portion 12 and the bend holding portion 32. The bend covering portion 52 does not need to cover the entirety of the bent portion 12 and the bend holding portion 32, and it suffices that the bend covering portion 52 covers at least a portion of the bent portion 12 and the bend holding portion 32.

The straight portion covering portion 53 linearly extends continuous with the bend covering portion 52. The straight portion covering portion 53 covers the straight portion 14 and the straight portion holding portion 36. The straight portion covering portion 53 does not need to cover the entirety of the straight portion 14 and the straight portion holding portion 36, and it suffices that the straight portion covering portion 53 covers at least a portion of the straight portion holding portion 36. The vehicle fixing portion 40 is provided outward of the straight portion covering portion 53. The leading end portion of the second wall portion 38 laterally protrudes from the straight portion covering portion 53. The first extended portion 41 and the second extended portion 42 are exposed.

The wire covering portion 54 covers the cable 20 that extends out from one end portion of the bracket 30. The wire covering portion 55 covers the cable 20 that extends out from the other end portion of the bracket 30. The wire covering portion 54 is continuous with the bend covering portion 52, and the wire covering portion 55 is continuous with the straight portion covering portion 53. The wire covering portions 54 and 55 extend linearly.

The main body portion 51 is formed in a quadrangular tube shape, and the wire covering portions 54 and 55 are formed in a cylindrical shape. The main body portion 51 may also be formed in a cylindrical shape or the like. The wire covering portions 54 and 55 may also be formed in a quadrangular tube shape or the like.

In the wire covering portion 54, the thickness of the base end portion that is continuous with the bend covering portion 52 is greater than the thickness of the leading end portion from which the cable 20 extends out. Since the base end portion of the wire covering portion 54 is continuous with an end portion of the bend covering portion 52, the base end portion may be subjected to a greater reaction force from the bent portion 12, compared to the lead end portion. Since the base end portion of the wire covering portion 54 is thicker than the lead end portion thereof, the base end portion can easily bear the reaction force from the bent portion 12. Here, in the wire covering portion 54, the thickness gradually increases from the leading end portion toward the base end portion. A configuration is also possible in which a portion including the leading end portion has a constant first thickness, and a portion including the base end portion has a constant second thickness that is thicker than the first thickness.

In the wire covering portion 55, the thickness of the base end portion that is continuous with the straight portion covering portion 53 is the same as the thickness of the leading end portion from which the cable 20 extends out. Since the base end portion of the wire covering portion 55 is continuous with an end portion of the straight portion covering portion 53, there is no major difference in the reaction forces that the base end portion and leading end portion of the wire covering portion 55 are subjected to from the cable 20. For this reason, even when the thickness of the wire covering portion 55 is constant, the cable 20 can be reliably held.

Since the reaction force of the cable 20 is mainly taken on by the bracket 30, a case is suppressed in which the resin molded portion 50 is subjected to a large reaction force from the cable 20. For this reason, the resin molded portion 50 has a small thick portion for receiving a large reaction force from the cable 20. In this manner, the weight and size of the wiring member 110 in which the resin molded portion 50 is provided are reduced.

The bracket 30 as described above is a rigid member made of metal, a solid resin, or the like. For this reason, the bracket 30 is highly rigid, and is suitable for holding a desired bent shape. On the other hand, a case is also possible in which the wiring member 10 is disposed in a narrow space in which the holding portion 31 of the bracket 30 may come in contact with peripheral members. In this case, if the holding portion 31 of the bracket 30 is exposed, the holding portion 31 may damage the peripheral members which are in contact with the holding portion 31.

The resin molded portion 50 described as above is made of a resin such as polyurethane resin. Polyurethane resin is easy to deform, while having excellent shock-resistance, and is suitable for protecting the cable 20 and the peripheral members that are in contact with the resin molded portion 50. For this reason, in the case where the bent portion 12 of the cable 20 is held by the resin molded portion 50, when the cable 20 inside attempts to return to its original shape, holding the desired bent shape may be difficult.

In such a case, the wiring member 110 provided with the bracket 30 and the resin molded portion 50 is more effective. In other words, in the wiring member 110, the peripheral members which are in contact with the cable 20 and the resin molded portion 50 can be protected by the resin molded portion 50 while the cable 20 is kept in the desired bent shape by the bracket 30.

The resin molded portion 50 as described above may be formed in one piece by performing insert molding using an injection mold, and using a portion of the cable 20 held by the holding portion 31 as an insert. That is, the resin molded portion 50 is a molded component.

As shown in FIG. 4, a configuration is also possible in which resin of the resin molded portion 50 is interposed between the bent portion 12 and the joining wall portion 35, and the cable 20 does not come into contact with the joining wall portion 35. In this manner, friction between the bent portion 12 and the joining wall portion 35 is suppressed. For example, when molding the resin molded portion 50, the cable 20 may also be held while raised from the joining wall portion 35. For example, a pin-like jig for holding the cable 20 may also be inserted into the through hole 44 of the bracket 30. A hole corresponding to the pin-like jig may also be formed in the resin molded portion 50. Having said so, the cable 20 may also come into contact with the joining wall portion 35.

Supplementary Note

Figure 6:
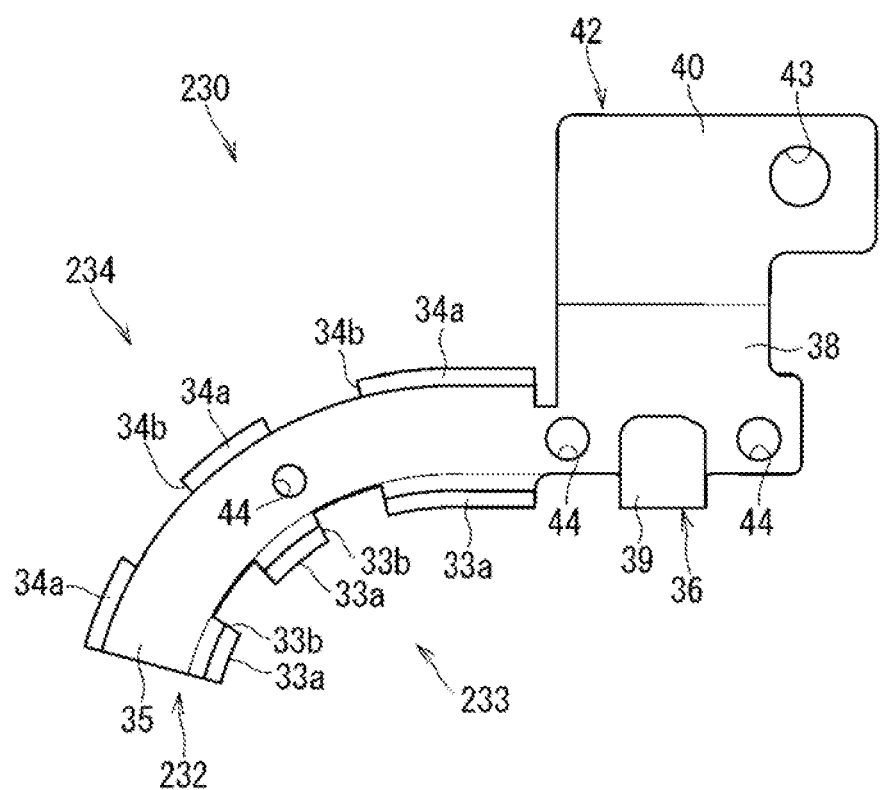
FIG. 6 is a plan view showing a bracket according to a first variation.

FIG. 6 is a plan view showing a bracket 230 according to a first variation.

In the bracket 230 according to the first variation, the shape of a bend holding portion 232 is different from the shape of the bend holding portion 32. In the bend holding portion 232, both an inner wall portion 233 and an outer wall portion 234 are intermittently provided along the bent path. In this manner, due to at least one of the inner wall portion 233 and the outer wall portion 234 being intermittently provided along the bent path, the weight of the bracket 30 can be reduced.

The inner wall portion 233 includes a plurality of small wall portions 33a. The plurality of small wall portions 33a are provided at intervals along the direction in which the cable 20 extends. Slits 33b are formed between the plurality of small wall portions 33a.

The outer wall portion 234 includes the plurality of small wall portions 34a. The plurality of small wall portions 34a are provided at intervals along the direction in which the cable 20 extends. Slits 34b are formed between the plurality of small wall portions 34a.

The number and size of the small wall portions 33a and 34a provided along the direction in which the cable 20 extends may be set as appropriate. The number and size of the slits 33b and 34b along the direction in which the cable 20 extends may be set as appropriate. For example, in the example shown in FIG. 6, the slits 33b of the inner wall portion 233 and the slits 34b of the outer wall portion 234 are provided at the same position along the direction in which the cable 20 extends. The slits 33b of the inner wall portion 233 and the slits 34b of the outer wall portion 234 may also be provided at different positions along the direction in which the cable 20 extends. The slits 33b of the inner wall portion 233 and the slits 34b of the outer wall portion 234 may also have different widths along the direction in which the cable 20 extends.

Figure 7:
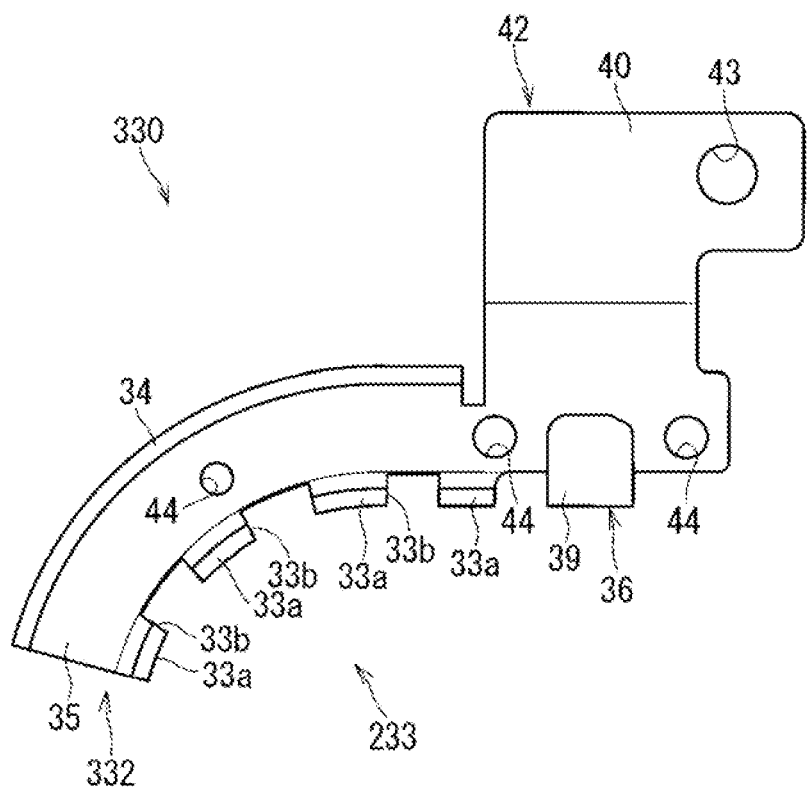
FIG. 7 is a plan view showing a bracket according to a second variation.

FIG. 7 is a plan view showing a bracket 330 according to a second variation.

In the bracket 330 according to the second variation, the shape of a bend holding portion 332 is different from the shapes the bend holding portions 32 and 232. In the bend holding portion 332, one of the inner wall portion 233 and the outer wall portion 34 is continuously provided along the bent path, and the other is intermittently provided along the bent path. In this manner, while improving the rigidity of the bend holding portion 32 due to the wall portion being continuously provided along the bent path, the weight of the bracket 330 can be reduced due to the wall portion being intermittently provided along the bent path.

In the example shown in FIG. 7, similarly to the outer wall portion 34 of the bracket 30, the outer wall portion 34 is continuously provided along the bent path. Also, similarly to the inner wall portion 233 of the bracket 230, the inner wall portion 233 is intermittently provided along the bent path. A configuration is also possible in which the inner wall portion 33 is continuously provided along the bent path, and the outer wall portion 234 is intermittently provided along the bent path. In the wall portion that is intermittently provided along the bent path, the number and size of the small wall portions 33a along the direction in which the cable 20 extends may be set as appropriate. In the wall portion that is intermittently provided along the bent path, the number and size of the slits 33b along the direction in which the cable 20 extends may be set as appropriate.

The brackets 230 and 330 may be applied to either of the first and second embodiments. That is, in the wiring member 10 according to the first embodiment, the brackets 230 or 330 may also be applied instead of the bracket 30. In the wiring member 110 according to the second embodiment, the brackets 230 and 330 may also be applied instead of the bracket 30.

Additionally, in the above description, the holding portion 31 includes the straight portion holding portion 36, and the vehicle fixing portion 40 is provided at the straight portion holding portion 36. However, such a configuration need not be necessarily required. Further, the holding portion 31 need not include the straight portion holding portion 36, for example. Further, the vehicle fixing portion 40 may also be provided at the bend holding portion 32, for example.

Also, in the above description, the straight portion holding portion 36 includes the first wall portion 37, the second wall portion 38, and the third wall portion 39. However, such a configuration need not be necessarily required. For example, it is also possible that in the straight portion holding portion 36, the third wall portion 39 is omitted and only the first wall portion 37 and the second wall portion 38 are included. Also, three sides of the straight portion holding portion 36 that covers the cable 20 may also be the same as the three sides of the bend holding portion 32 that covers the cable 20. In the straight portion holding portion 36, a fourth wall portion that covers the cable 20 from the same side as the outer wall portion 34 may also be provided instead of the third wall portion 39. In this case, the vehicle fixing portion 40 may also extend out from the first wall portion 37 or the fourth wall portion.

The wiring members 10 and 110 may also be used as a composite harness including a plurality of kinds of cables 20. As described above, if the core cables 22A are power source lines and the core wires 22B are signal lines, the wiring members 10 and 110 are composite harnesses including the power source lines (core cables 22A) and the signal lines (core cables 22B). In particular, if the wiring members 10 and 110 include power source lines (core cables 22A) for an electric brake and signal lines (core wires 22B) for detecting the vehicle speed, the wiring members 10 and 110 are composite harnesses for a brake.

Also, the wiring members 10 and 110 may also include six or more core cables 22. For example, two or three or more core cables 22 for ADS (Active Damper Suspension) may also be added. The core cables 22 to be added may be power source lines or signal lines. The allowable current value of the power source line is set to a value greater than that of the signal line in many cases. For this reason, the power source line is thicker than the signal line in many cases. Accordingly, if the core wires 22 to be added are power source lines, the reaction force of the cable 20 is greater than the case where the core cables 22 to be added are signal lines. For this reason, if the core wire 22 to be added is a power source line, the bent portion 12 is more effectively held by the bracket 30.

Note that the configurations described in the above embodiments and variations can be combined with each other as long as no mutual contradiction arises.

What is claimed is:

1. A wiring member comprising:
   a wire including a bent portion that is routed along a bent path; and
   a bracket including a holding portion for holding the wire and a vehicle fixing portion that protrudes outward of the holding portion,
   wherein the holding portion includes a bend holding portion for holding the bent portion of the wire; and
   the bend holding portion includes an inner wall portion located on an inner circumferential side of the wire, and an outer wall portion located on an outer circumferential side of the wire, on the bent path; and
   a resin molded portion formed through insert molding using at least the bent portion and the bend holding portion as an insert, wherein the vehicle fixing portion is located outside of the resin molded portion; and
   wherein the bend holding portion further includes a joining wall portion that joins the inner wall portion and the outer wall portion to each other, and resin of the resin molded portion is interposed between the bent portion and the joining wall portion.

2. The wiring member according to claim 1, wherein the wire is a multi-core cable including a plurality of core wires and a sheath for covering the plurality of core wires,
   the bent portion is provided at a portion where the sheath is provided, and
   the plurality of core wires extend out from an end portion of the sheath, and are connected to a plurality of devices located on an underbody of a vehicle.

3. The wiring member according to claim 1, wherein the wire further includes a straight portion that is routed along a straight path that is adjacent to the bent portion of the wire in a direction in which the wire extends,
   the holding portion further includes a straight portion holding portion for holding the straight portion, and
   the vehicle fixing portion is provided at the straight portion holding portion.

4. The wiring member according to claim 3, wherein the straight portion holding portion includes a first wall portion, a second wall portion, and a third wall portion,
   the first wall portion covers the wire from the same side as the inner wall portion or the outer wall portion,
   the second wall portion and the third wall portion respectively protrude from two end portions of the first wall portion and face each other with the wire interposed therebetween, and
   the vehicle fixing portion extends out from the second wall portion.

5. The wiring member according to claim 4, wherein the vehicle fixing portion includes a first extended portion that extends from the second wall portion so as to oppose the first wall portion, and
   a distance between the first extended portion and the first wall portion is greater than a distance between the inner wall portion and the outer wall portion.

6. The wiring member according to claim 1, wherein at least one of the inner wall portion and the outer wall portion is continuously provided along the bent path.

7. The wiring member according to claim 1, wherein at least one of the inner wall portion and the outer wall portion is intermittently provided along the bent path.

8. The wiring member according to claim 1, wherein one of the inner wall portion and the outer wall portion is continuously provided along the bent path, and the other of the inner wall portion and the outer wall portion is intermittently provided along the bent path.

* * * * *